United States Patent
Watanabe et al.

(10) Patent No.: US 12,313,863 B2
(45) Date of Patent: May 27, 2025

(54) IMAGE SENSOR

(71) Applicant: OMRON Corporation, Kyoto (JP)

(72) Inventors: Kosuke Watanabe, Kusatsu (JP); Yasuhito Uetsuji, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 750 days.

(21) Appl. No.: 17/440,433

(22) PCT Filed: Feb. 17, 2020

(86) PCT No.: PCT/JP2020/006077
§ 371 (c)(1),
(2) Date: Sep. 17, 2021

(87) PCT Pub. No.: WO2020/189134
PCT Pub. Date: Sep. 24, 2020

(65) Prior Publication Data
US 2022/0155498 A1   May 19, 2022

(30) Foreign Application Priority Data
Mar. 20, 2019   (JP) ................. 2019-053219

(51) Int. Cl.
*G02B 3/14*   (2006.01)
*H04N 23/52*  (2023.01)

(52) U.S. Cl.
CPC ............ *G02B 3/14* (2013.01); *H04N 23/52* (2023.01)

(58) Field of Classification Search
CPC . G02B 3/14; G02B 7/008; G02B 7/08; G02B 7/09; G02B 7/28; G03B 3/10;
(Continued)

(56) References Cited

U.S. PATENT DOCUMENTS 6,768,536 B2* 7/2004 Okuwaki ............. G02F 1/29
                                              349/200
8,439,266 B2* 5/2013 Kawashima ....... G06K 7/10722
                                              235/462.11
(Continued)

FOREIGN PATENT DOCUMENTS

EP        3296813 A1    3/2018
JP    2010262246 A     11/2010
(Continued)

OTHER PUBLICATIONS

Liquid Lens. (May 11, 2021). Foctek.net. https://www.foctek.net/News/Industry-News-page-16-146.html#:~:text=The%20liquid%20lens%20acts%20as.*
(Continued)

*Primary Examiner* — Stephone B Allen
*Assistant Examiner* — Daniel Jeffery Jordan
(74) *Attorney, Agent, or Firm* — ROSSI, KIMMS & McDOWELL LLP (57) ABSTRACT

An image sensor includes an optical system including a liquid lens, a nonvolatile memory that stores property information about an amount of change in a refractive power of the liquid lens in response to an application voltage, a temperature sensor that detects a temperature of the liquid lens, and a body module. The optical system, the nonvolatile memory, and the temperature sensor are disconnectable from the body module that includes a controller that performs image processing on image data received from a imaging device and performs liquid lens control for determining the application voltage to be applied to the liquid lens based on the property information stored in the nonvolatile memory, the temperature of the liquid lens detected by the temperature sensor, and a target value for the refractive power of the liquid lens and applying the application voltage to the liquid lens.

6 Claims, 5 Drawing Sheets

(58) Field of Classification Search
CPC .. G03B 17/14; G03B 17/565; G03B 2206/00; H04N 17/002; H04N 23/52; H04N 23/60; H04N 25/61
USPC ....... 351/159.34, 159.68; 359/342, 354, 380, 359/395, 422, 432, 489.04, 512, 578, 665, 359/666, 676
See application file for complete search history.

(56) References Cited

U.S. PATENT DOCUMENTS

| | | |
|---|---|---|
| 9,055,894 B2 | 6/2015 | Okamoto |
| 2006/0171696 A1* | 8/2006 | Murata .................. H04N 23/69 396/72 |
| 2012/0024954 A1 | 2/2012 | Komi |
| 2017/0090076 A1 | 3/2017 | Nunnink |
| 2018/0084168 A1 | 3/2018 | Waldl |

FOREIGN PATENT DOCUMENTS

| | | |
|---|---|---|
| JP | 2010286740 A | 12/2010 |
| JP | 2016095353 A | 5/2016 |

OTHER PUBLICATIONS

International Search Report issued in Intl. Appln. No. PCT/JP2020/006077 mailed May 12, 2020. English translation provided.
Written Opinion issued in Intl. Appln. No. PCT/JP2020/006077 mailed May 12, 2020. English translation provided.
Extended European Search Report issued in European Appln. No. 20774356.8 mailed Nov. 25, 2022.

* cited by examiner

IMAGE SENSOR

FIELD

The present invention relates to an image sensor including a liquid lens.

BACKGROUND

A variety of recent optical apparatuses (e.g., imaging apparatuses) include liquid lenses. A liquid lens is an optical component including a conductive water solution and a nonconductive oil sealed in a lens holder, and has the oil-water interface deformed to change the refractive power in response to a voltage applied.

The liquid lens has the refractive power versus application voltage characteristics that are dependent on temperature. Thus, the refractive power of the liquid lens may deviate from an intended value under heat from an ambient environment around the optical apparatus or from the optical apparatus energized with electricity. This may be avoidable with two methods. One is to maintain the liquid lens at a constant temperature by controlling heating in the optical apparatus (refer to, for example, Patent Literature 1). The other is to correct the voltage value in accordance with the monitored temperature of the liquid lens and apply the resulting voltage to the liquid lens.

CITATION LIST

Patent Literature

Patent Literature 1: U.S. Patent Application Publication No. 2017/0090076

SUMMARY

Technical Problem

The first method uses a heater and thus increases the power consumption of the apparatus. The second method uses less power but involves accurate determination of a correction value for the application voltage. Further, individual liquid lenses have different properties and may have different refractive powers in response to the same temperature and the same voltage applied. The second method thus involves voltage value correction reflecting individual differences in addition to temperature. Producing image sensors that can correct the application voltage reflecting such differences between individual liquid lenses thus involves accurate determination of correction information for individual image sensors (liquid lenses).

An image sensor used for automatic inspection and process control includes an image processing unit, such as a microprocessor unit (MPU) or a digital signal processor (DSP). The image processing unit may be used to determine correction information for each image sensor. A relatively small image sensor referred to as a smart camera typically has the liquid lens located near the image processing unit and also has a small space inside its housing. The liquid lens is thus susceptible to heat from the image processing unit. The image sensor is structurally likely to retain heat inside. In the production processes of image sensors, each image sensor may be energized with electricity to obtain correction information. Upon energization, the temperature of the sensor starts rising inside the housing and may reach thermal equilibrium in as long as several tens of minutes depending on the conditions. To obtain accurate correction information, the optical properties of the liquid lens are to be measured in a constant temperature environment.

The image processing unit cannot yield voltage correction information that reflects differences between individual liquid lenses with satisfactory accuracy and without reducing production efficiency.

In response to the above issue, one or more aspects of the present invention are directed to an image sensor that corrects the application voltage to reflect differences between individual liquid lenses, and can be produced efficiently.

Solution to Problem

An image sensor according to one aspect of the present invention includes an optical system including a liquid lens, an imaging device having an imaging surface on which an image of an object is to be formed by the optical system, a nonvolatile memory that stores property information about an amount of change in a refractive power of the liquid lens in response to an application voltage, a temperature sensor that detects a temperature of the liquid lens, and a body module. The optical system, the nonvolatile memory, and the temperature sensor are disconnectable from the body module. The body module included in the image sensor includes a controller that performs image processing on image data received from the imaging device and performs liquid lens control for determining the application voltage to be applied to the liquid lens based on the property information stored in the nonvolatile memory, the temperature of the liquid lens detected by the temperature sensor, and a target value for the refractive power of the liquid lens and applying the application voltage to the liquid lens.

More specifically, the image sensor includes a module (hereafter, a lens module) including the optical system including the liquid lens. The lens module is disconnectable from the body module that includes the controller for performing image processing on image data received from the imaging device. The lens module disconnected from the body module can have the liquid lens unaffected by heat from the controller, thus allowing the liquid lens to be at a constant temperature during property measurement. This allows accurate and fast determination of property information for determining the application voltage. The lens module includes the nonvolatile memory for storing the accurately determined property information and the temperature sensor for detecting the temperature of the liquid lens. The image sensor with this structure corrects the application voltage to reflect differences between individual liquid lenses, and can be produced efficiently.

The property information stored in the nonvolatile memory may be used, in addition to the temperature of the liquid lens and the target value for the refractive power of the liquid lens, to determine the application voltage to be applied to the liquid lens (or more specifically, the application voltage that causes the liquid lens to have the refractive power matching the target value). Thus, the property information may be relational information indicating the relationship among the refractive power, the application voltage, and the temperature of the liquid lens, or may be a part of the relational information.

In the image sensor, the property information may be a part of relational information indicating a relationship among the refractive power, the application voltage, and the temperature of the liquid lens, and the controller may determine the relational information to be used in the liquid lens control based on a preset other part of the relational information and the property information read from the nonvolatile memory. In the image sensor with this structure, the relational information may include a first parameter and a second parameter having a smaller variation resulting from an individual difference in the liquid lens than the first parameter, and the part of the relational information may include the first parameter. The relational information may include a temperature-independent parameter selected as the first parameter.

The relational information (property information, or both property information and information stored in the controller) may include a table indicating the relationship among the refractive power, the application voltage, and the temperature of the liquid lens (with multiple items of information about the refractive power of the liquid lens in response to a given voltage applied at a given temperature). The relational information may indicate the relationship between the refractive power and the application voltage for each temperature.

The relational information may indicate a relational expression indicating a mutual relationship among the refractive power, the application voltage, and the temperature of the liquid lens. The relational expression indicated by the relational information may include a formula indicating a relationship between the refractive power and the application voltage of the liquid lens using a function of the temperature as a coefficient. The formula indicating the relationship between the refractive power and the application voltage of the liquid lens may be at least a formula expressing the refractive power of the liquid lens as a polynomial in terms of the application voltage of the liquid lens, or a formula expressing the application voltage of the liquid lens as a polynomial in terms of the refractive power of the liquid lens.

The relational information may include coefficients in a function formula and a table. More specifically, the relational information may include coefficients in one of function formulas g(T) and h(V) that can determine refractive power P at temperature T with application voltage V in the computation below, and include a table for determining the value of the other function formula.

$$P = g(T) \cdot h(V)$$

Advantageous Effects

The image sensor according to the above aspects of the present invention corrects the application voltage to reflect differences between individual liquid lenses, and can be produced efficiently.

DETAILED DESCRIPTION

Embodiments of the present invention will now be described with reference to the drawings.

Figure 1:
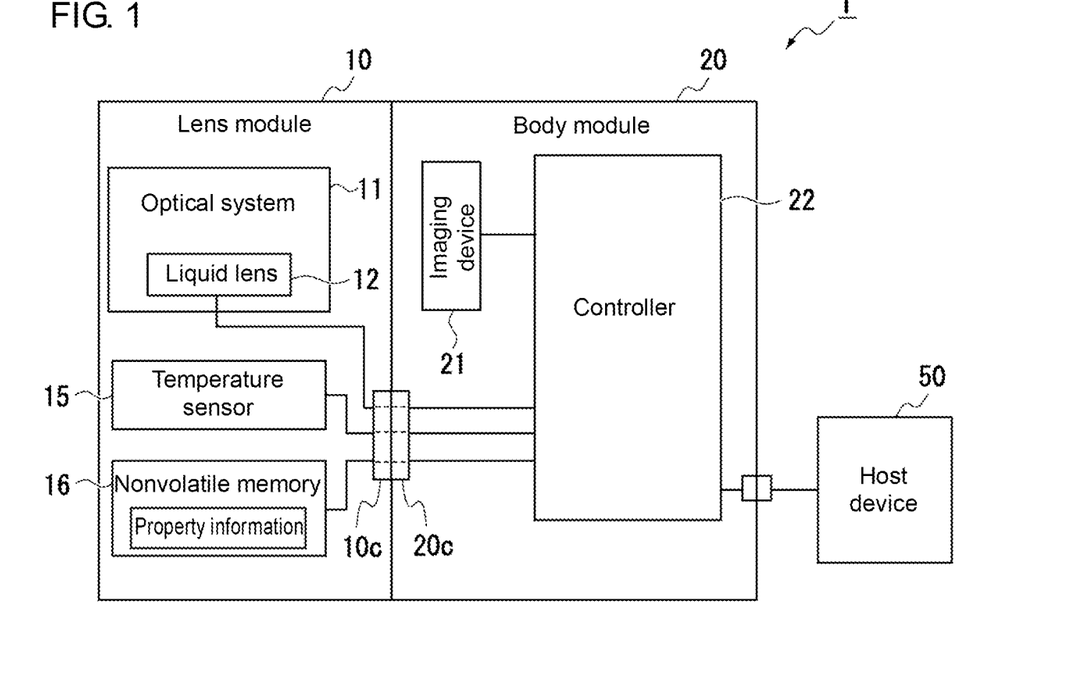
FIG. 1 is a schematic diagram of an image sensor according to an embodiment of the present invention.

FIG. 1 is a schematic diagram of an image sensor 1 according to an embodiment of the present invention.

The image sensor 1 according to the present embodiment is to be connected to a host device 50 for automatic inspection and process control. The host device 50 is a computer with a program installed for using the image sensor 1. The host device 50 is typically connected to multiple image sensors 1.

As illustrated, the image sensor 1 includes a lens module 10 and a body module 20. The lens module 10 includes an optical system 11, a temperature sensor 15, and a nonvolatile memory 16. The body module 20 includes an imaging device 21 and a controller 22.

The optical system 11 combines lenses to allow light from an object (imaging target) to form an image on the imaging surface of the imaging device 21. The optical system 11 includes a liquid lens 12 with refractive power controllable in response to a different voltage being applied.

The temperature sensor 15 detects the temperature of the liquid lens 12. The temperature sensor 15 is, for example, a resistance temperature detector or a temperature sensor integrated circuit (IC).

The nonvolatile memory 16 is used to store property information. The nonvolatile memory 16 typically uses a serial bus or a serial interface such as a serial peripheral interface (SPI) or an inter-integrated circuit (I²C), and may be a serial electrically erasable programmable read-only memory (EEPROM).

The property information stored in the nonvolatile memory 16 is used to determine the voltage to be applied to the liquid lens 12. The property information is used, in addition to the temperature of the liquid lens 12 and the target value for the refractive power of the liquid lens 12, to determine the application voltage that causes the liquid lens 12 to have the refractive power matching the target value at the current temperature. The property information allows correction of the application voltage for the liquid lens 12 within the guaranteed operating temperature range.

The property information set for the image sensor 1 (nonvolatile memory 16) according to the present embodiment and the specific procedure for setting the property information for the image sensor 1 will be described in detail later.

The lens module 10 includes the optical system 11, the temperature sensor 15, and the nonvolatile memory 16 attached to a housing (not shown). The lens module 10 is detachable from the body module 20. The lens module 10 includes a connector 10c to be fitted to a connector 20c in the body module 20 for attaching the lens module 10 to the body module 20. The connector 10c is connected to the components in the lens module 10 (the liquid lens 12, the temperature sensor 15, and the nonvolatile memory 16), and the connector 20c is connected to the controller 22 in the body module 20, as schematically indicated by solid and dashed lines in FIG. 1. More specifically, the connector 10c is connected to the components in the lens module 10 and the connector 20c is connected to the controller 22 to allow the liquid lens 12, the temperature sensor 15, and the nonvolatile memory 16 to be electrically connected to the controller 22 with the connector 10c and the connector 20c fitted together.

The imaging device 21 is a two-dimensional image sensor such as a complementary metal-oxide-semiconductor (CMOS) or a charge-coupled device (CCD).

The controller 22 performs various types of image processing on image data received from the imaging device 21 and outputs the processing results to the host device 50. The controller 22 also performs liquid lens control for applying a voltage reflecting temperature correction to the liquid lens 12. Examples of such image processing include reading barcodes and checking for abnormalities. The controller 22 includes, for example, a driver IC for generating an application voltage for the liquid lens 12 and a microcontroller.

The liquid lens control performed by the controller 22 includes first liquid lens control and second liquid lens control. The first liquid lens control is performed by the controller 22 when the image sensor 1 is turned on. The second liquid lens control is performed by the controller 22 in response to an instruction for changing the installation distance from the host device 50. The installation distance may also be referred to as a working distance.

Figure 2:
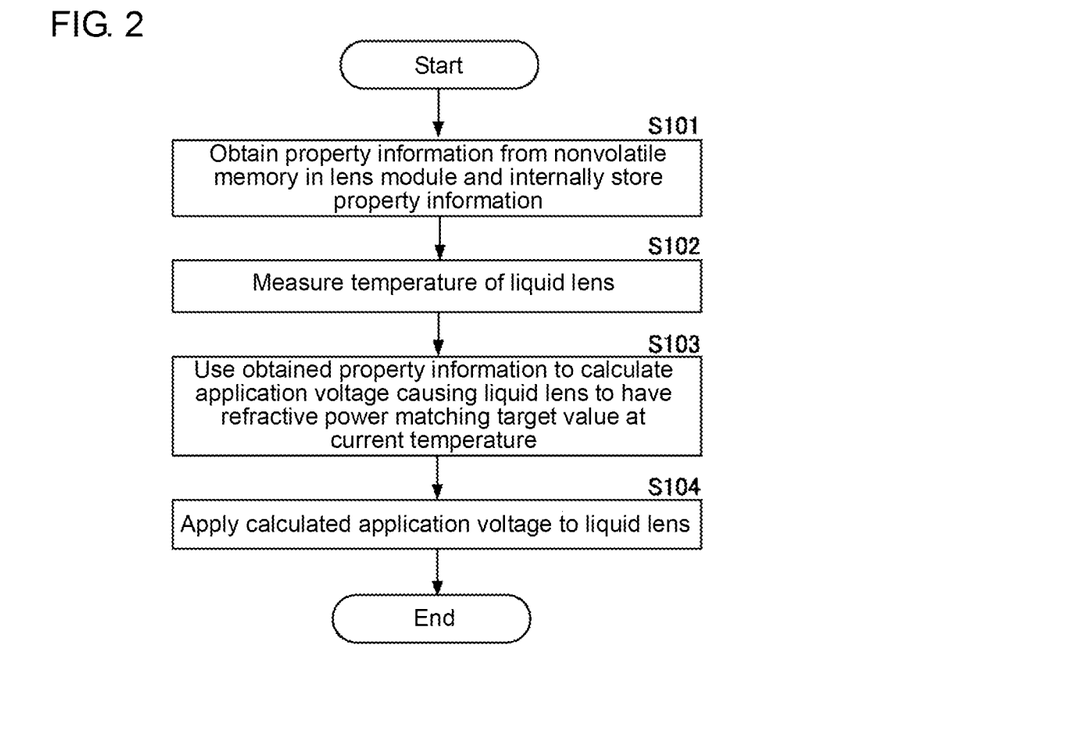
FIG. 2 is a flowchart of first liquid lens control performed by a controller in the image sensor.

The controller 22 performs the first liquid lens control shown in FIG. 2.

More specifically, the controller 22 starts the first liquid lens control when the image sensor 1 is turned on. The controller 22 first reads property information from the nonvolatile memory 16 in the lens module 10 and internally stores the information (step S101). The controller 22 then measures the temperature of the liquid lens 12 based on an output from the temperature sensor 15 (step S102).

The controller 22 then uses the property information obtained from the lens module 10 (nonvolatile memory 16) and stored internally (obtained property information in FIG. 2) to determine the application voltage that causes the liquid lens 12 to have the refractive power matching the target value at the current temperature (step S103). In step S103 (described in detail later), the target value in the first liquid lens control is the refractive power of the liquid lens 12 corresponding to the installation distance set for the image sensor 1 when the first liquid lens control is performed. The installation distance is preset by the user or a default. The refractive power of the liquid lens 12 corresponding to the installation distance refers to the refractive power of the liquid lens 12 focusing on the object at the same distance as the installation distance from the front end of the optical system 11.

After step S103, the controller 22 applies the determined application voltage to the liquid lens 12 (step S104) and ends the first liquid lens control.

Figure 3:
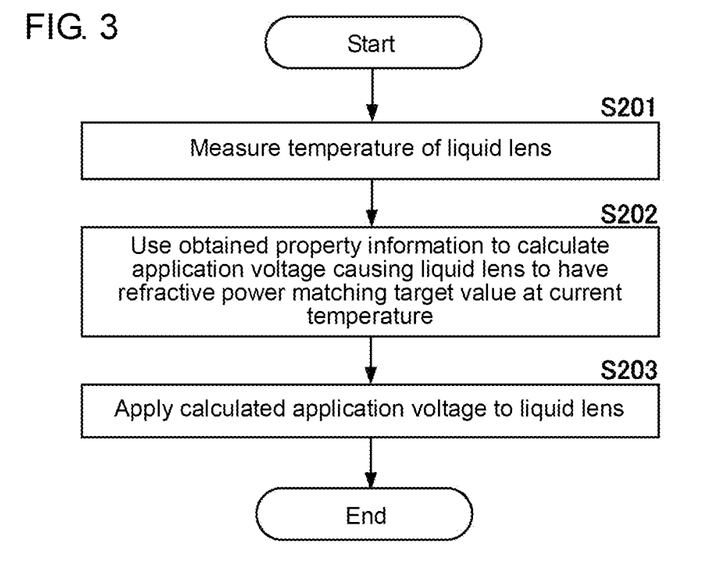
FIG. 3 is a flowchart of second liquid lens control performed by the controller in the image sensor.

FIG. 3 shows the second liquid lens control performed by the controller 22 in response to an instruction for changing the installation distance.

The second liquid lens control includes steps S201 and S203, which are identical to steps S102 and S104 in the first liquid lens control. The second liquid lens control includes step S202, which differs from step S103 in the first liquid lens control in that the target value is the refractive power of the liquid lens 12 corresponding to the installation distance specified in the instruction for changing.

In other words, the second liquid lens control (FIG. 3) is basically the same as the first liquid lens control (FIG. 2) performed when the image sensor 1 is turned on. Through the first liquid lens control performed when the image sensor 1 is turned on, the controller 22 already has the property information about the liquid lens 12 at the start of the second liquid lens control. The second liquid lens control thus does not include reading the property information from the nonvolatile memory 16 in the lens module 10.

The property information set for the image sensor 1 and the procedures of steps S103 and S202 are described in detail below. The refractive power of the liquid lens 12 is hereafter also simply referred to as a refractive power.

The image sensor 1 according to the present embodiment has two real numbers stored in the nonvolatile memory 16 as property information.

More specifically, as shown in Formulas (1) to (3) below, the liquid lens 12 included in the image sensor 1 has refractive power P at temperature T with application voltage V expressed by a linear expression in terms of application voltage V, where the term of degree one has a coefficient of quadratic expression S(T) in terms of temperature T, and the term of degree zero has a coefficient of quadratic expression Y(T) in terms of temperature T.

$$P = S(T) \times V + Y(T) \tag{1}$$

$$S(T) = s_2 \times T^2 + s_1 \times T + s_0 \tag{2}$$

$$Y(T) = y_2 \times T^2 + y_1 \times y_0 \tag{3}$$

The values of $s_0$ and $y_0$ have relatively large variations resulting from differences between the individual liquid lenses 12, whereas the values of the other four coefficients ($s_2$, $s_1$, $y_2$, and $y_1$) have almost no variations resulting from differences between individual units. The nonvolatile memory 16 can have its storage space wasted by storing the coefficient values with almost no variations resulting from differences between the individual liquid lenses 12. The image sensor 1 has the $s_2$, $s_1$, $y_2$, and $y_1$ values preset for the controller 22 and has the $s_0$ and $y_0$ values alone to be stored in the nonvolatile memory 16.

In steps S103 and S202 in the first liquid lens control and the second liquid lens control (FIGS. 2 and 3), the application voltage is calculated using the preset $s_2$, $s_1$, $y_2$, and $y_1$ values, as well as the above property information. More specifically, in steps S103 and S202, application voltage V is calculated using the preset $s_2$, $s_1$, $y_2$, and $y_1$ values, the $s_0$ and $y_0$ values obtained from the lens module 10, temperature T of the liquid lens 12, and target refractive power Ptgt of the liquid lens 12 to perform the following computation (refer to Formulas (1) to (3)).

$$V = (Ptgt - (y_2 \times T^2 + y_1 \times T + y_0))/(s_2 \times T^2 + s_1 \times T + s_0) \tag{4}$$

The procedure for setting the property information for the image sensor 1 will now be described.

Figure 4:
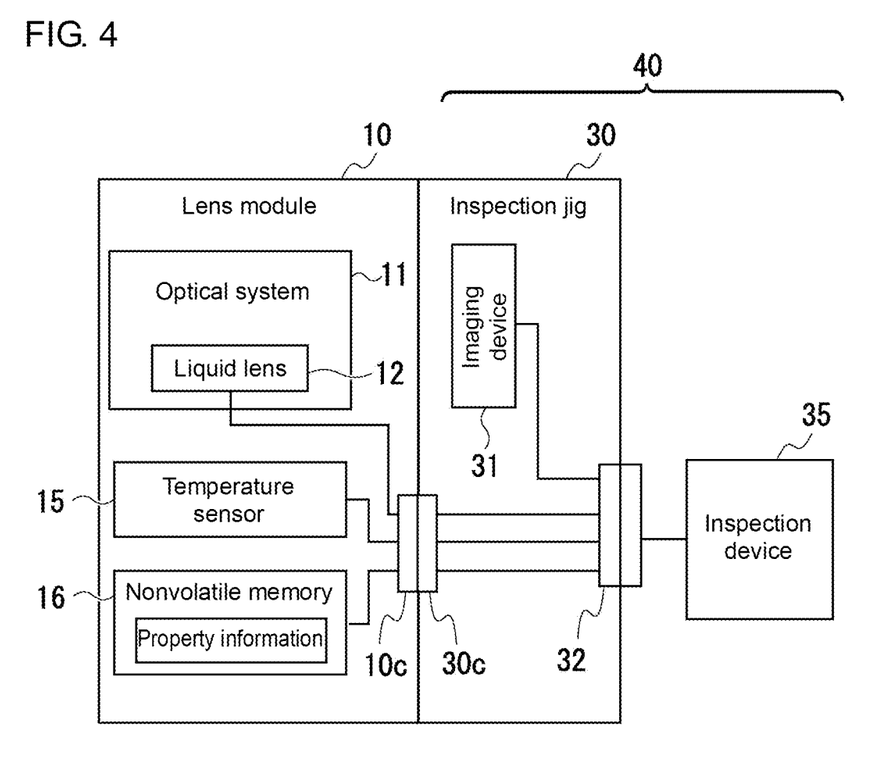
FIG. 4 is a schematic diagram of an inspection system prepared for setting property information for the image sensor.

FIG. 4 is a schematic diagram of an inspection system 40 for setting the property information for the image sensor 1. As illustrated, the inspection system 40 for setting the property information for the image sensor 1 includes an inspection jig 30 and an inspection device 35.

The inspection jig 30 corresponds to the body module 20 excluding the controller 22. In other words, the inspection jig 30 can receive the lens module 10. The inspection jig 30 includes a connector 30c to be fitted to the connector 10c in the lens module 10 attached (hereafter, also referred to as an attached module 10). The inspection jig 30 also includes an imaging device 31. The imaging device 31 and the optical system 11 in the attached lens module 10 are in the same positional relationship as the imaging device 21 and the optical system 11 in the lens module 10 attached to the body module 20.

The inspection jig 30 also includes a connector 32. The connector 32 is connected to the connector 30c and the imaging device 31 to allow the inspection device 35 to be connected to the liquid lens 12, the temperature sensor 15, the nonvolatile memory 16, and the imaging device 31 when the connector 32 is connected to the cable from the inspection device 35.

The inspection device 35 performs property information setting for determining property information about the liquid lens 12 in the attached module 10 and writing the determined information onto the nonvolatile memory 16 in the attached module 10. As described (defined) above, the attached module 10 refers to the lens module 10 attached to the inspection jig 30.

Figure 5:
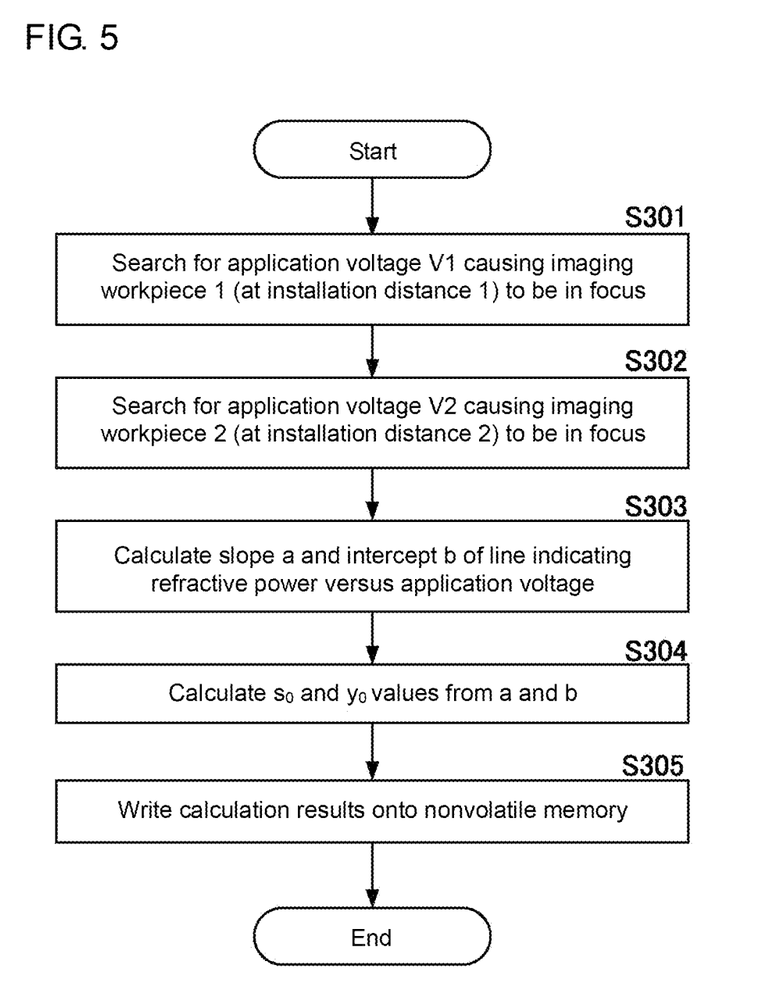
FIG. 5 is a flowchart of property information setting performed by an inspection device in the inspection system.

FIG. 5 is a flowchart of the property information setting.

The property information setting is performed for the attached module 10 and the inspection jig 30 being controlled to have a predetermined temperature (25° C. in the present embodiment). Similarly to the body module 20 (controller 22), the inspection device 35 has preset values for the coefficients $s_2$, $s_1$, $y_2$, and $y_1$ with no or small variations resulting from differences between the individual liquid lenses 12 in the coefficients in Formulas (2) and (3) described above.

Figure 6:
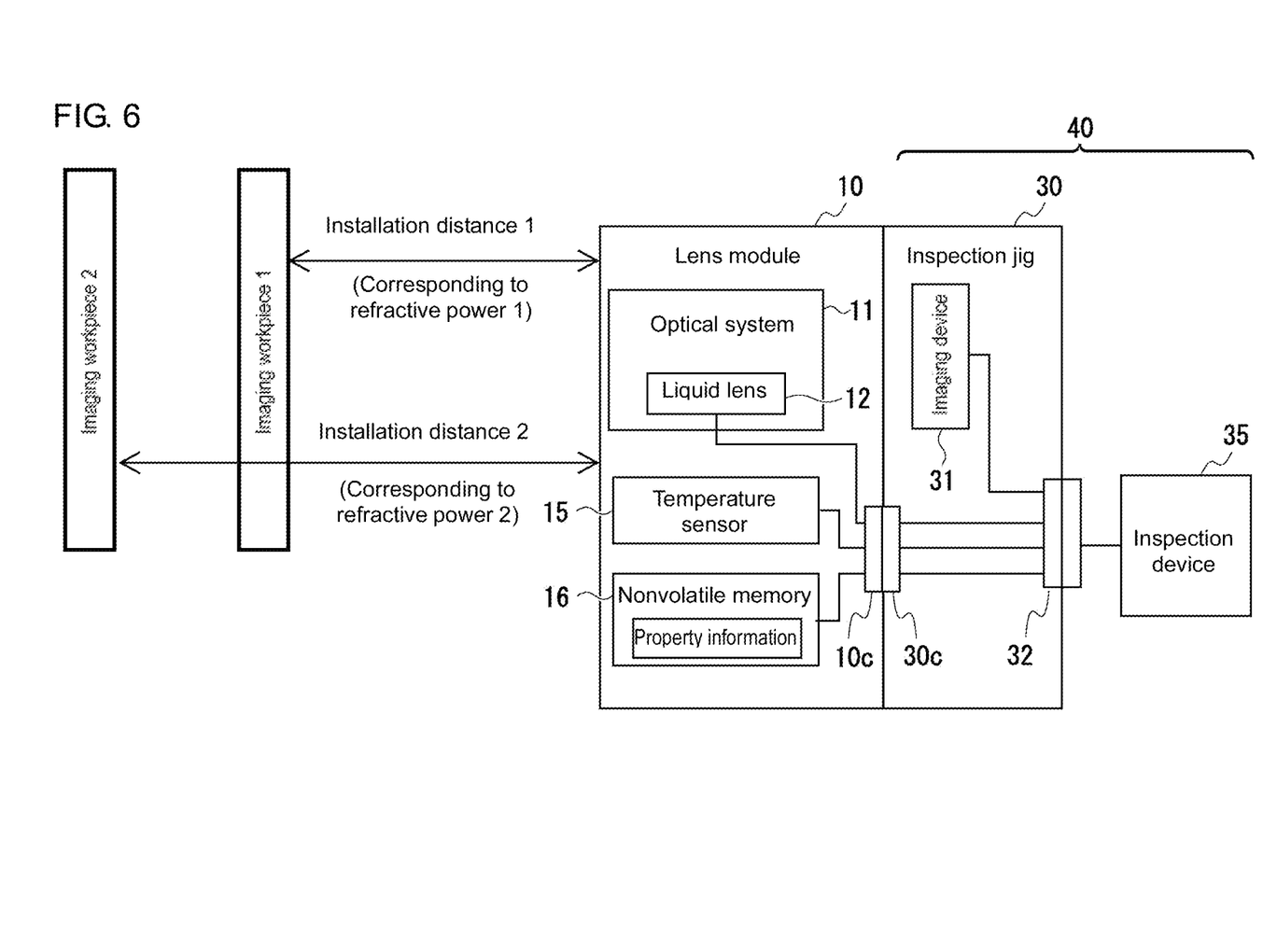
FIG. 6 is a diagram describing an environment for performing the property information setting.

As shown in FIG. 5, the property information setting starts by searching for an application voltage V1 that causes an imaging workpiece 1 to be in focus (step S301) and searching for an application voltage V2 that causes an imaging workpiece 2 to be in focus (step S302). As schematically shown in FIG. 6, the imaging workpieces 1 and 2 refer to objects to be used for focus adjustment placed at installation distances 1 and 2. The refractive power of the lens 12 corresponding to the installation distance n (n=1, 2) is hereafter referred to as a refractive power n.

The property information setting in the present embodiment includes steps S301 and S302 for repeatedly changing the application voltage for the liquid lens 12 and analyzing the image data received from the imaging device 31 to search for the application voltage that maximizes the contrast between adjacent pixels, and setting the search results as the application voltages V1 and V2. Steps S301 and S302 may be any processes for searching for the application voltages for focusing.

Figure 7:
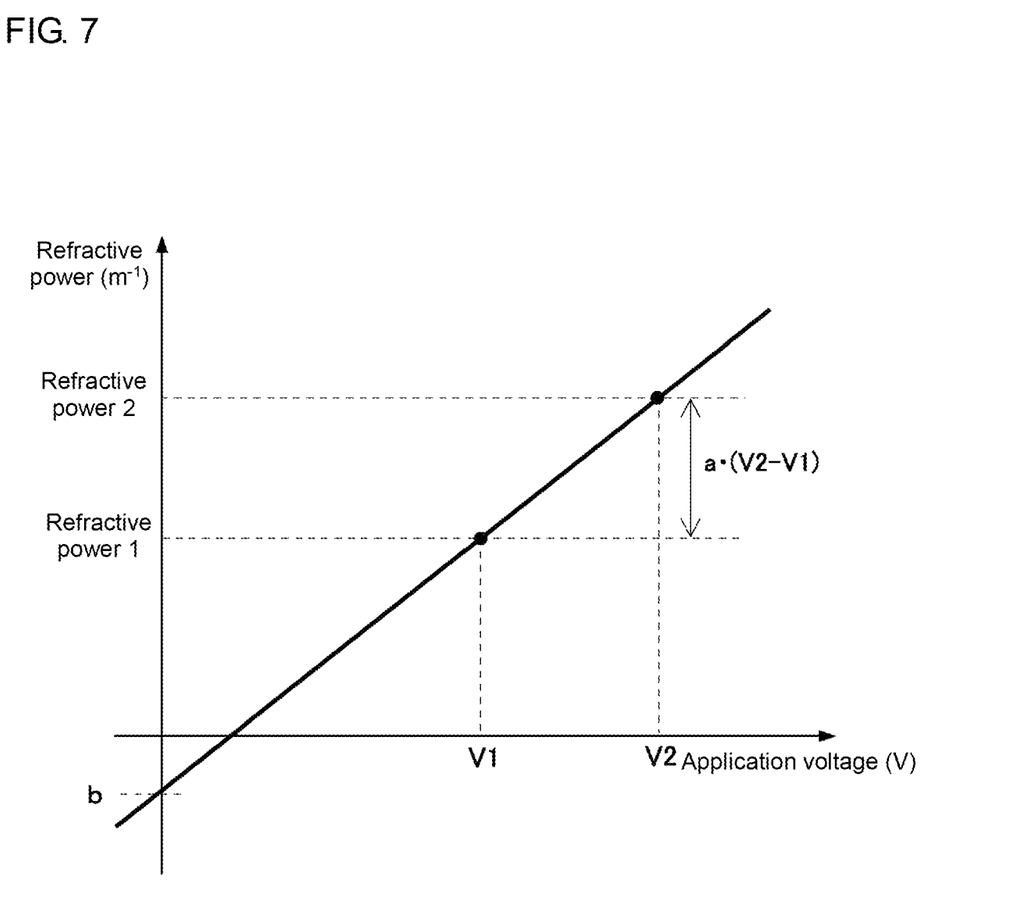
FIG. 7 is a graph describing step S303 in the property information setting.

In response to step S302 being complete, the slope a and the intercept b are calculated for the line indicating the relationship between the refractive powers 1 and 2 and the application voltages V1 and V2 (the line indicating the refractive power versus the application voltage in FIG. 5) (step S303). More specifically, as shown in FIG. 7, the slope a and the intercept b are calculated for the line passing through the coordinate point (application voltage V1, refractive power 1) and the coordinate point (application voltage V2, refractive power 2) in the Cartesian coordinates having the vertical axis indicating the refractive power and the horizontal axis indicating the application voltage.

The $s_0$ value in Formula (2) and the $y_0$ value in Formula (3) above are then calculated based on, for example, the calculated slope a and the calculated intercept b (step S304). More specifically, in step S304, the $s_0$ value is calculated by substituting the known numbers (the $s_2$, $s_1$, a, and T values) into the formula $s_0 = a - s_2 \times T^2 - s_1 \times T$. In step S304, the $y_0$ value is also calculated by substituting the known numbers (the $y_2$, $y_1$, b, and T values) into the formula $y_0 = b - y_2 \times T^2 - y_1 \times T$. The first formula is an expression for $s_0$ resulting from transforming Formula (2) in which S(T) is replaced by a. The second formula is an expression for $y_0$ resulting from transforming Formula (3) in which Y(T) is replaced by b.

The $s_0$ and $y_0$ values are then written onto the nonvolatile memory 16 in the attached module 10 as property information (step S305). The property information setting is thus complete.

In the image sensor 1 according to the present embodiment described above, the lens module 10 including the optical system 11 including the liquid lens 12 is disconnectable from the body module 20 including the controller 22. The lens module 10 disconnected from the body module 20 can have the liquid lens 12 unaffected by heat from the controller 22, thus allowing each image sensor 1 to accurately determine property information for the individual liquid lens 12. The lens module 10 includes the nonvolatile memory 16 for storing the accurately determined property information and the temperature sensor 15 for detecting the temperature of the liquid lens 12. Thus, the controller 22 in the image sensor 1 (the controller 22 in the body module 20 with the lens module 10 attached) can correct the application voltage for the liquid lens 12 to reflect temperature differences and differences between the individual liquid lenses 12.

Modifications

The image sensor 1 according to the above embodiments may be modified variously. For example, among Formulas (1) to (3) above representing the refractive power of the liquid lens 12, Formulas (2) and (3) may include the coefficient values all with variations resulting from differences between the individual liquid lenses 12. In this case, the image sensor 1 may be modified to include the nonvolatile memory 16 for storing all the coefficient values in Formulas (2) and (3) ($s_2$, $s_1$, $s_0$, $y_2$, $y_1$, and $y_0$) as property information. The image sensor 1 can be modified in this manner by simply modifying the controller 22 to use the $s_2$, $s_1$, $y_2$, and $y_1$ values in the property information obtained from the lens module 10 to calculate application voltage V with the Formula (4). The application voltages that cause the imaging workpieces to be in focus may be searched for under six conditions with different combinations of temperatures and installation distances. All the coefficient values in Formulas (2) and (3) can thus be calculated from the search results.

For the liquid lens 12 with the refractive power that cannot be closely approximated by Formula (1) (a linear expression in terms of V), the property information may be information indicating all or some of the coefficient values in Formula (5) or (6) below. Some coefficient values may be determined (selected) from either formula as property information based on, for example, the degrees of variations resulting from differences between the individual liquid lenses 12.

$$P = \sum_{i=0}^{n} C_i(T) \times V^i \qquad (5)$$

$$V = \sum_{i=0}^{n} D_i(T) \times P^i \qquad (6)$$

In these formulas, n is an integer of 2 or greater. $C_i(T)$ (i=0 to n) is a function of temperature T indicating the coefficient value of the term of degree i in Formula (5), which expresses refractive power P as an expression of degree n. $D_i(T)$ (i=0 to n) is a function of temperature T indicating the coefficient value of the term of degree i in Formula (6), which expresses application voltage V as an expression of degree n.

Formulas (1) to (3), (5), and (6) above indicate the relationship between refractive power P and application voltage V of the liquid lens 12 using a function of temperature T as a coefficient. As described above, the property information may be used, in addition to the temperature of the liquid lens 12 and the target value for the refractive power of the liquid lens 12, to determine the application voltage that causes the liquid lens 12 to have the refractive power matching the target value at the current temperature. Thus, the property information may be information indicating the relationship among the refractive power, the application voltage, and the temperature of the liquid lens 12 (hereafter, relational information), or may be a part of the relational information. The relational information is not limited to a formula indicating the relationship between refractive power P and application voltage V of the liquid lens 12 using a function of temperature T as a coefficient. For example, the relational information may indicate a formula indicating the relationship between refractive power P and temperature T using a function of application voltage V as a coefficient. The relational information may include coefficients in a function formula and a table. More specifically, the relational information may include coefficients in one of function formulas g(T) and h(V) that can determine refractive power P at temperature T with application voltage V in the computation below, and include a table for determining the value of the other function formula.

$$P = g(T) \cdot h(V)$$

In the example described above, the relational information (stored in the nonvolatile memory 16 partially or entirely as property information) indicates coefficients in a relational expression. In some embodiments, the relational information may include a table indicating the relationship among the refractive power, the application voltage, and the temperature of the liquid lens 12 (with multiple items of information about the refractive power of the liquid lens 12 with a given voltage applied at a given temperature). The relational information may indicate the relationship between the refractive power and the application voltage for each temperature. For such relational information (other than coefficients in a relational expression), the property information stored in the nonvolatile memory 16 may be independent of temperature.

The relational information may not directly indicate the relationship among the refractive power, the application voltage, and the temperature. For example, the relational information may indicate the relationship among a value correlated with the refractive power (e.g., a working distance), the application voltage, and the temperature.

APPENDIX

An image sensor (1), comprising:
an optical system (11) including a liquid lens (12);
an imaging device (21) having an imaging surface on which an image of an object is to be formed by the optical system (11);
a nonvolatile memory (16) configured to store property information about an amount of change in a refractive power of the liquid lens (12) in response to an application voltage;
a temperature sensor (15) configured to detect a temperature of the liquid lens (12); and
a body module (20),
wherein the optical system (11), the nonvolatile memory (16), and the temperature sensor (15) are disconnectable from the body module (20), and
the body module (20) includes a controller (22) configured to perform image processing on image data received from the imaging device (21) and to perform liquid lens control for determining the application voltage to be applied to the liquid lens (12) based on the property information stored in the nonvolatile memory (16), the temperature of the liquid lens (12) detected by the temperature sensor (15), and a target value for the refractive power of the liquid lens (12) and applying the application voltage to the liquid lens (12).

REFERENCE SIGNS LIST 1 image sensor
10c, 20c, 30c, 32 connector
10 lens module
11 optical system
12 liquid lens
15 temperature sensor
16 nonvolatile memory
20 body module
21, 31 imaging device
22 controller
30 inspection jig
35 inspection device
40 inspection system
50 host device

The invention claimed is:
1. An image sensor, comprising:
an optical system including a liquid lens;
an imaging device having an imaging surface on which an image of an object is to be formed by the optical system;
a nonvolatile memory configured to store property information about an amount of change in a refractive power of the liquid lens in response to an application voltage;
a temperature sensor configured to detect a temperature of the liquid lens; and
a body module,
wherein the optical system, the nonvolatile memory, and the temperature sensor are disconnectable from the body module, and
the body module includes a controller configured to perform image processing on image data received from the imaging device and to perform liquid lens control for determining the application voltage to be applied to the liquid lens based on the property information stored in the nonvolatile memory, the temperature of the liquid lens detected by the temperature sensor, and a target value for the refractive power of the liquid lens and applying the application voltage to the liquid lens,
a mutual relationship among the refractive power, the application voltage, and the temperature of the liquid lens is indicated by a relational expression including a plurality of parameters,
the plurality of parameters includes a first parameter and a second parameter, the second parameter having a smaller variation resulting from an individual difference in the liquid lens than the first parameter,
the first parameter is stored, as the property information, in the nonvolatile memory, and
the second parameter is preset for the controller.
2. The image sensor according to claim 1, wherein the first parameter is temperature-independent.
3. The image sensor according to claim 1, wherein the relational expression includes a formula indicating a relationship between the refractive power and the application voltage of the liquid lens using a function of the temperature as a coefficient.

4. The image sensor according to claim 3, wherein the formula indicating the relationship between the refractive power and the application voltage of the liquid lens is at least a formula expressing the refractive power of the liquid lens as a polynomial in terms of the application voltage of the liquid lens, or a formula expressing the application voltage of the liquid lens as a polynomial in terms of the refractive power of the liquid lens.

5. The image sensor according to claim 1, wherein the controller determines the application voltage to be applied to the liquid lens by substituting the first parameter read from the nonvolatile memory, the preset second parameter, the temperature of the liquid lens detected by the temperature sensor, and a target value for the refractive power of the liquid lens into the relational expression.

6. The image sensor according to claim 1, wherein the relational expression includes the following Formulas (1) to (3):

$$P = S(T) \times V + Y(T) \quad (1)$$

$$S(T) = s_2 \times T^2 + s_1 \times T + s_0 \quad (2)$$

$$Y(T) = y_2 \times T^2 + y_1 \times T + y_0 \quad (3)$$

where P is the refractive power of the liquid lens, V is the application voltage, and T is the temperature of the liquid lens, wherein $s_0$ and $y_0$ correspond to the first parameter, and $s_2$, $s_1$, $y_2$, and $y_1$ correspond to the second parameter.

* * * * *